UNITED STATES PATENT OFFICE.

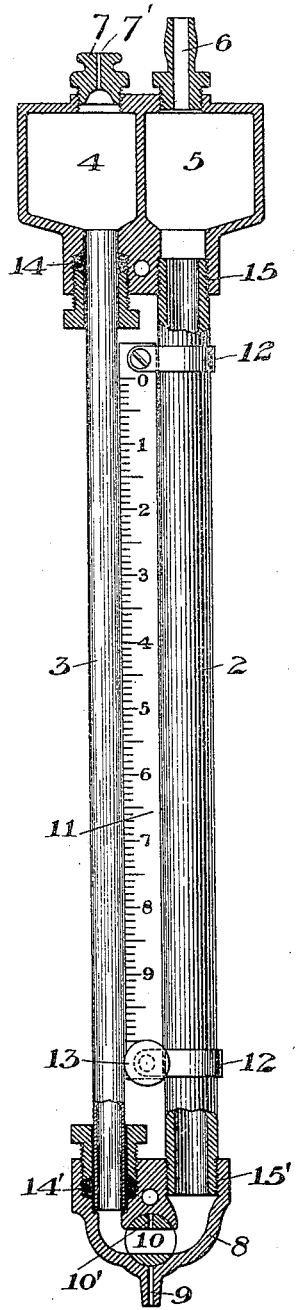

GEORGE H. BARRUS, OF BROOKLINE, MASSACHUSETTS, ASSIGNOR OF ONE-HALF TO EARL HARLEY GOWING, OF READING, MASSACHUSETTS.

MULTIPLYING DRAFT-GAGE.

No. 801,202.  Specification of Letters Patent.  Patented Oct. 10, 1905.

Application filed October 4, 1904. Serial No. 227,106.

*To all whom it may concern:*

Be it known that I, GEORGE H. BARRUS, of Brookline, Norfolk county, Massachusetts, have invented a new and useful Multiplying Draft-Gage, of which the following is a full, clear, and exact description, reference being had to the accompanying drawing, forming part of this specification, which shows in side elevation and partly in vertical section a draft-gage constructed in accordance with my invention.

The purpose of my invention is to provide an accurately-operating and durable draft-gage for measuring the force of draft of stacks, &c., designed to multiply the indication of the draft usually indicated in terms of inches of water-pressure.

Heretofore draft-gages have been made comprising two parallel columns of glass connected at the bottom and adapted to contain two bodies of liquids of different densities; but such gages being of glass were very liable to break not only in shipment, but in practical use. There were no means of emptying the instrument except by taking it down and inverting it, and when emptying it it was extremely difficult to keep some part of the liquids from mingling. There were also no ready means for reducing the amount of the liquids when adjusting the gage. My present invention overcomes all these difficulties and provides a gage which is not easily broken and which can be emptied and adjusted without difficulty.

My invention comprises a U-tube gage, consisting of two parallel tubes, one of metal and the other of glass, each of which is connected at the upper end with a chamber whose cross-sectional area is considerably greater than that of the tube, both being connected at the bottom by a U-shaped piece or bridge. The liquids with which the gage is filled extend into the upper chambers. The gage is supplied with two non-mixing liquids of different colors—as, for example, alcohol colored red and petroleum—and when the suction of the draft is applied to one of the upper chambers the liquid in the glass tube will travel down a considerably greater vertical distance than it is moved in the enlarged chambers. This multiplies the indication of the force of draft, which can readily be observed by noting the distance of motion of the line of demarcation between the two non-mixing liquids.

In the accompanying drawing, 2 represents the metal tube, 3 the parallel transparent tube or glass. These tubes are connected at their upper end to the chambers 4 5 of an integral casting. The chamber 5 has a nipple 6 adapted to be connected with the flue whose draft is to be measured, and the chamber 4 has an opening closed by a plug 7 for the introduction of the liquids. At the lower end the tubes 2 and 3 are connected by a U-shaped hollow connecting-piece 8, having at the bottom an outlet-opening 9 and having a three-way cock 10 adapted to be turned into the position shown in the drawing, so as to connect the tubes 2 and 3, or to be turned at right angles thereto, so as to connect either one of the tubes with the outlet 9 without connecting the other therewith.

11 is a scale which is mounted parallel with the glass tube 3 and is movable and adjustable parallel therewith by means of collars 12 and an adjusting-screw 13.

The glass tube 3 is connected at the ends to the chamber 4 and connecting-piece 8, respectively, by stuffing-boxes 14 14', and the metal tube 2 may be screwed into the chamber 5 and connecting-piece 8, as indicated at 15 15'. The bottom of each of the chambers 4 and 5 is preferably conical, so as to prevent the lodging of any of the heavier liquid in corners when the lighter liquid is being introduced.

The instrument is filled by pouring the heavier of the two liquids through the opening 7 into the chamber 4 until the level of liquid reaches the lower part of the chambers 4 and 5 on both sides. Then the other liquid is poured into the same opening until the line of demarcation between the liquids comes into view at the zero-point of the scale 11.

When the gage is put into use, the nipple 6 is connected with the flue, and the suction exerted therethrough draws the line of demarcation between the liquids downward in the tube 3 to a distance which varies in accordance with the force of the draft. By calibrating the instrument with reference to water-pressure the force of the draft is determined from the number of inches the marking-line moves below the zero of the scale.

The three-way cock 10 is arranged so as to draw off the liquid from either of the tubes 2 or 3, or both, without moving the instrument from place or inverting it. For this purpose it has a drain-opening 10'. When the cock is in its normal position, (shown in the drawing,) it affords a full opening between the two tubes, and when turned ninety degrees to the left the tube 3 and chamber 4 are emptied, and when turned so as to present the opening 10′ toward the tube 2 this tube and the chamber 5 are emptied.

The cap 7 serves to cover the filling-opening and to exclude the dirt. It is provided with a small hole 7′, which admits air to the chamber 4 and maintains the atmospheric pressure therein.

Within the scope of my invention as defined in the claims the apparatus may be modified in many ways, since

What I claim is—

1. A draft-gage comprising an integral partitioned upper portion containing multiplying-chambers and a U-tube secured to said chambers, a portion of said tube being of transparent material; substantially as described.

2. A draft-gage comprising an integral partitioned upper portion containing multiplying-chambers, an integral lower return portion and two connections between said upper and lower portions, one of said connections being of transparent material; substantially as described.

3. A draft-gage comprising an integral partitioned upper portion containing multiplying-chambers, said chambers having conical floors, an integral lower return portion, two tubes connecting said upper and lower portions, one of said tubes being of transparent material, and a scale adjacent to one of the tubes; substantially as described.

4. A draft-gage comprising an integral partitioned upper portion having multiplying-chambers with conical floors, a capped filling-orifice in one of said chambers, an integral lower return connection having a draining device, tubes connecting said upper and lower portions, one of said tubes being of transparent material and an adjustable scale adjacent to the transparent tube; substantially as described.

5. A U-tube draft-gage containing two nonmixing liquids of different colors, and having a three-way cock suitably located for draining off either liquid at will; substantially as described.

In testimony whereof I have hereunto set my hand.

GEORGE H. BARRUS.

Witnesses:
 JOHN BROWN,
 J. E. DAVIS.